Figure 1:
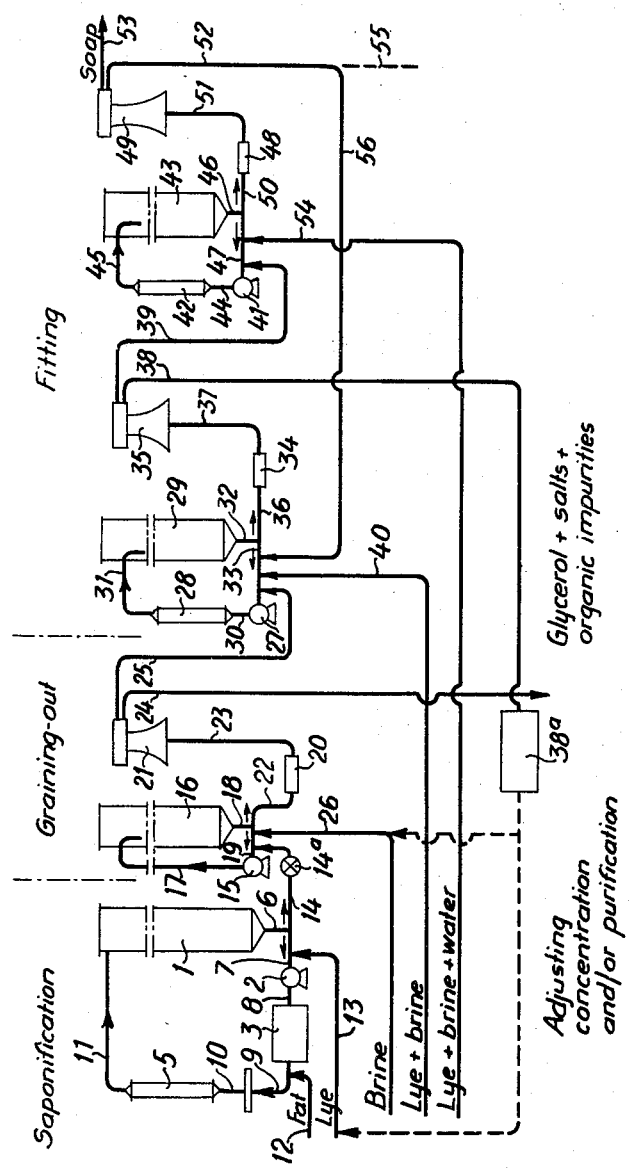

Sept. 16, 1958     F. T. PALMQVIST     2,852,347

APPARATUS FOR CONTINUOUS SOAPMAKING

Original Filed Jan. 2, 1951     3 Sheets-Sheet 1

INVENTOR.
Fredrik Teodor Palmqvist
BY
Davis, Hoxie & Faithfull
ATTORNEYS

Sept. 16, 1958      F. T. PALMQVIST      2,852,347
APPARATUS FOR CONTINUOUS SOAPMAKING Original Filed Jan. 2, 1951      3 Sheets-Sheet 2

INVENTOR.
Fredrik Teodor Palmqvist
BY
Davis, Hoxie & Faithfull
ATTORNEYS

United States Patent Office 2,852,347
Patented Sept. 16, 1958

2,852,347

APPARATUS FOR CONTINUOUS SOAPMAKING

Fredrik Teodor Palmqvist, Stockholm, Sweden, assignor to Aktiebolaget Separator, Stockholm, Sweden, a corporation of Sweden Original application January 2, 1951, Serial No. 203,840, now Patent No. 2,727,915, dated December 20, 1955. Divided and this application September 27, 1955, Serial No. 536,800

15 Claims. (Cl. 23—260)

This invention relates to apparatus for the continuous manufacture of soap, in which the material is subjected to a series of successive operations. The present application is a division of my copending application Serial No. 203,840, filed January 2, 1951, now Patent No. 2,727,915.

The manufacture of soap in a continuous process is not novel in itself, but apparatus heretofore devised for this purpose have certain inconveniences, which it is an object of the present invention to overcome.

In the conventional manufacture of soap, the procedure is briefly as follows: Fat and lye are saponified, and the product obtained is grained out with a salt solution, usually common salt, whereupon the neat soap thus formed is separated from the spent lye and then washed, in a fitting stage, with lye and salt solution, a purified soap thereby being obtained after removal of the new spent lye or the niger.

The apparatus of the present invention differs from prior apparatus in regard to the manner in which it carries out the various stages.

It is known that when saponifying fat with lye the reaction at first takes place slowly, until a certain amount of fat has been saponified, and then suddenly proceeds at a very high rate which then diminishes. Thus, the time-saponification curve is similar to an S. This fact is utilized in the present invention.

A characterizing feature of the present invention is that, after continuity of operation has been reached, the apparatus maintains saponified fat in continuous circulation in a separate circuit in the first or saponification stage, and means are provided for adding lye at a suitable point of the circuit in order to saponify non-saponified fat (if any) and fat difficult to saponify, as well as fat fed to this circuit. The lye and fat are continuously added in fixed proportions and thoroughly mixed or atomized in the circulating material, and means are provided for continuously withdrawing a quantity of saponified fat (corresponding to the added quantity) from the circuit and feeding it to the next stage.

Another feature of the invention is that the graining-out stage following the saponifying stage is fully separated from the latter and likewise provided with a circuit to which predetermined amounts of a salt solution are continuously fed while a portion of the circulating material is continuously withdrawn. This withdrawn material is led into a centrifugal separator where it is separated into a stream of neat soap, which is fed to the subsequent fitting stage, and a stream of spent lye containing traces of soap together with glycerol, salts and organic compounds, which are withdrawn from the process.

A third feature is that the neat soap is washed in one or several (usually two) successive fitting stages, each of which is preferably provided with a circuit to which neat soap, lye and salt solution are fed and from which a stream of the material is continuously withdrawn into and separated in a centrifugal separator. When two consecutive fitting stages are used, the neat soap from the separator of the first fitting stage is fed, together with lye, salt solution and water, to the circuit of the second fitting stage, and the niger discharged from the separator of the second fitting stage and consisting of lye, salt solution, soap and water is returned to and used in the circuit of the first fitting stage.

A fourth feature is that the saponifying and graining stages and, if required, the fitting stage or stages may be carried out in the present apparatus at super-atmospheric pressure, which makes it possible to use a raised temperature. The effect of the raised temperature is to shorten the saponifying time, to lower the viscosity of the material, resulting in increased throughput of the separators, and to reduce the water content of the grained-out soap, which facilitates the subsequent fitting or pitching operation. When the saponifying stage is effected at elevated pressure and elevated temperature, this part of the installation can be made smaller owing to its increased capacity. When the saponifying and graining stages, and possibly the fitting stage or stages, are effected at elevated pressure, an advantage is obtained in that the dosing or metering devices used for the supply of fat and lye (and, if required, salt solutions and water) to the circuits of the various stages, may be made as propelling devices for passing the soap mass through the whole or a part of the system, in which case they preferably consist of piston pumps. One or several of the pumps otherwise required in the pipes to the separators may then be eliminated. When elevated pressure is used, the separators should be of the air-tight or "closed" type.

Figure 2:
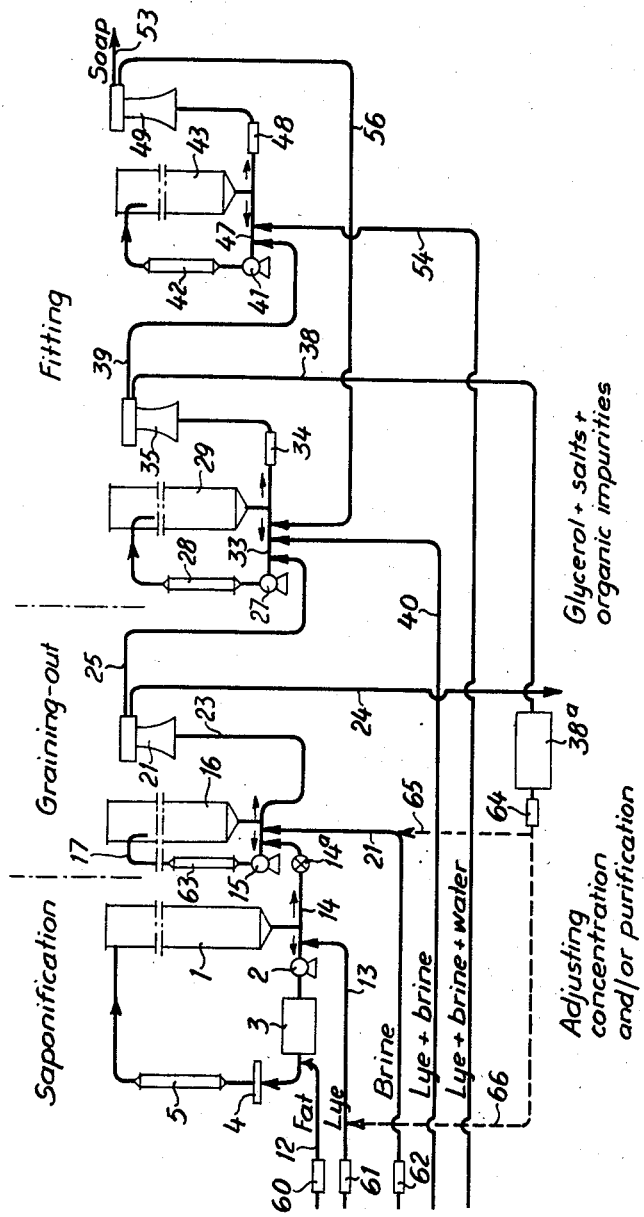
Figure 3:
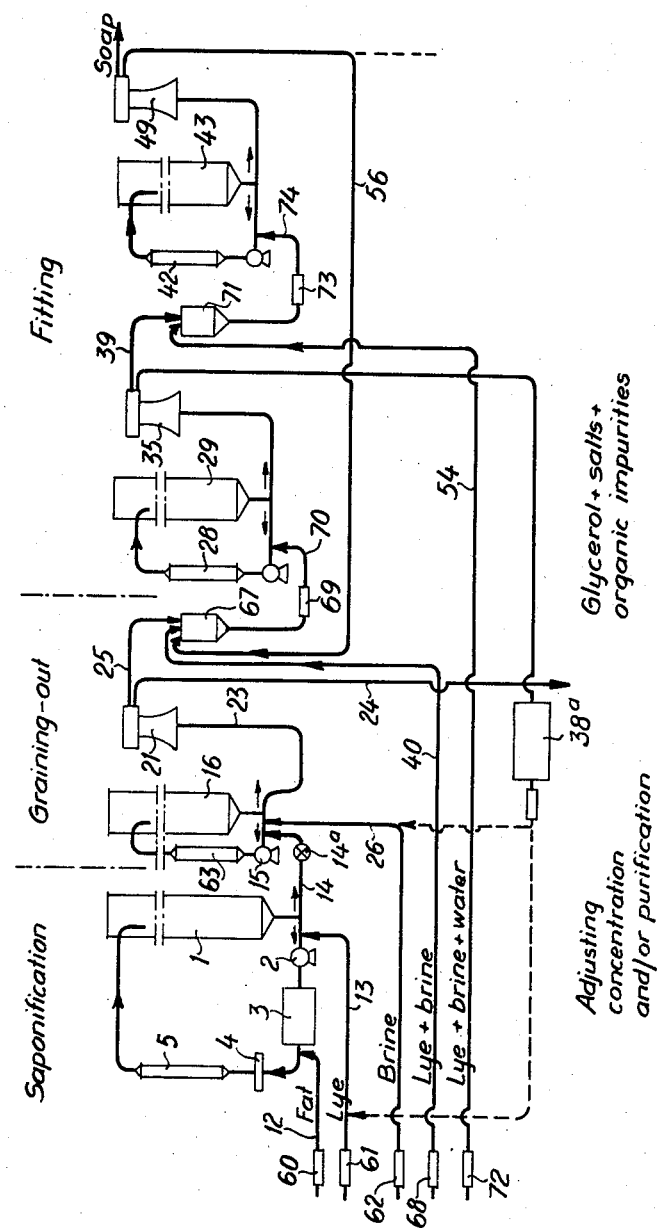

For a better understanding of the invention reference may be had to the following description in conjunction with the accompanying drawings, in which Figs. 1, 2 and 3 are diagrammatic views of three different forms of the new apparatus adapted for use in practicing the method of the invention.

In Fig. 1 I have illustrated a saponifying stage, a graining stage, and two fitting stages. The last fitting stage is not always necessary and may be eliminated.

The apparatus of the saponification stage comprises a tank or holding zone 1, a circulation pump 2, a tank or holding zone 3, a mixer 4, and a heater 5, communicating with one another through pipes 6, 7, 8, 9, 10 and 11, and forming together the circuit of the saponifying stage. The fat to be saponified is supplied through a fat feed line 12 and the lye through a lye feed line 13. In continuous operation, part of the material is withdrawn through pipe 14 to the next stage. The fat is generally in fluid form and the lye, usually sodium lye, is relatively strong. Before starting the plant, the pipe 14 is preferably closed by a valve 14a, whereupon fat and lye in accurately controlled amounts are continuously fed into the circuit through pipes 12 and 13, as by metering or dosing devices such as piston pumps, and are circulated by the pump 2. The mixture is heated in passing through the heater 5, which may be of any conventional type. The temperature should be sufficiently high to allow the soap to be pumped, but it may exceed 100° C. When the saponification takes place at a temperature higher than 100° C., the apparatus must be constructed to withstand the generated high pressure. After a period of feeding and circulation, with valve 14a closed, the tank 1 will be filled to a certain level and contain mainly saponified fat. The valve 14a is then opened and a stream containing a minor portion of the saponified fat is led through pipe 14, the major portion continuing to pass through the circuit while lye and fat are added thereto in fixed proportions. The lye added in front of the pump 2 saponifies any residual fat or fat difficult to saponify in the stream arriving from tank 1, the pump effecting a good mixing action so that the lye reacts with the soap in tank 3 to form an alkaline soap emulsion, to which fat is then added through pipe 12. Because the alkaline soap emulsion already contains a completely saponified fat when the addition of fat is made through pipe 12, the saponification of the added fat takes place more rapidly than if no soap were present. The saponification is facilitated by passing the material through the mixer or mixing zone 4, which produces an emulsion of fat and alkaline soap, and by the heating in the heating zone 5. As the saponifying reaction is exothermic, the heater 5 may, if required, be turned off during continuous operation. The soap discharging in continuous operation from tank 1 has been practically completely saponified therein. Owing to the continuous circulation in the saponifying circuit, it is possible to add the fat and lye through dosing or metering devices in the form of piston pumps, whereby they become evenly distributed in the mass by the circulation. The tank 1 has a small diameter in relation to its height, for the purpose of making the mass pass evenly through it.

The apparatus of the graining stage comprises a circulation pump 15, a tank 16, and communication pipes 17, 18 and 19, all of which form the circuit of the graining stage. This stage also comprises a feed pump 20, a centrifugal separator 21, pipes 22, 23, 24, 25 and also a pipe 26. Saponified material from the saponifying stage is fed to the circuit of the graining stage through the pipe 14, and a salt solution, generally containing ordinary salt, is added through pipe 26 from a dosing or metering device (not shown). Owing to the circulation in the graining circuit, a piston pump may also be used to advantage here as dosing device. The mixture is circulated through the graining circuit by the pump 15, and a part is discharged to the separator 21 through the pipe 22. The added salt solution should be of optimum quantity and concentration. After the material has passed through the separator 21, neat soap is obtained as one of the separated components in discharge pipe 25 and is led to the fitting stage or stages. The other separated component, comprising glycerol, small amounts of soap, salts and possibly organic impurities, is discharged through pipe 24 and withdrawn from the process. If required, a heating device (not shown) may be arranged in pipe 17.

The first fitting stage also includes a circuit, comprising a circulation pump 27, a heater 28, a tank 29 and communication pipes 30, 31, 32, 33, and also a feed pump 34, a centrifugal separator 35 and pipe lines 36, 37, 38, 39 and 40. Neat soap is fed to this circuit through pipe 25, and lye and salt solution through pipe 40. The mixture of these materials is pumped through the first fitting circuit by the pump 27 and is heated in the heater 28. Only a part of the circulating stream is withdrawn through pipe 36 into the separator 35. Lye and salt solution are preferably added through pipe 40 by a piston pump as the dosing or metering device. Neat soap is discharged from the separator 35 through the pipe 39 and is further treated in the second fitting stage, if there is any such stage. The other component separated in the centrifuge 35, which is niger consisting of a mixture of salts, soap and water, is discharged through the pipe 38. These products may be re-introduced into the process, as will be described in the following.

The second fitting stage has also a circuit, comprising a circulation pump 41, a heater 42, a tank 43, and pipes 44, 45, 46, 47, and also a feed pump 48, a centrifugal separator 49, and pipes 50, 51, 52, 53, 54. Neat soap is introduced into the circuit of the second fitting stage through pipe 39, and lye, salt solution and water through pipe 54, and are circulated by the pump while being heated in the heater 42. Only a small portion of the circulating mixture is withdrawn through pipe 50 and separated in the separator 49, from which soap mass discharges through the pipe 53 while niger is discharged through pipe 52 and is either withdrawn from the process through pipe 55 or reintroduced into the circuit of the first fitting stage through pipe 56. In this case, too, it is advantageous to use a piston pump (not shown) as the dosing or metering device for introducing lye, salt solution and water into the system through the pipe 54.

The niger discharging through pipe 38 in the first fitting stage may advantageously be reintroduced into the process, either wholly or in part, depending upon its composition. If required, it may first be purified in container 38a. Its alkali and salt contents may also be adjusted in container 38a by adding caustic soda, salt or water. The substances may be introduced into the circuits of the saponifying or graining-out stages, as indicated by dash lines in the drawings.

As compared with prior methods for continuous soap-making, the invention has the advantage of giving a practically complete saponification in a single stage, which is made possible because the niger is subjected to the action of lye in great excess during one phase of the process in the circuit. Another advantage is quick emulgation of the fat because it is pumped into niger. The saponification therefore starts on the steep part of the time-saponification curve, so that the saponification period becomes comparatively short. In other words, previously formed soap mass is utilized to accelerate the saponification, which, so far as I am aware, is a new principle in this art. In addition, the power consumption is lower than in most other processes for the same purpose, owing to the good fat-emulgating properties of the niger. The saponification heat is utilized to obtain better thermal economy, which is novel in conjunction with the circulation through the circuit of the saponification stage. The method also has the advantage of enabling a small total excess of lye, which means saving of lye as well as work and expense necessary to neutralize excess lye, all inconveniences inherent in other similar methods. By using a circuit in one or more of the various stages, any fluctuations in the dosing of substances added in the process are equalized, rendering it possible to use low speed piston pumps as dosing devices, which is advantageous owing to their reliability. By using holding tanks in the circuits, the circulating soap mass may be observed and supervised. Particular advantage is ascribed to the fact that the niger is grained-out in a separate stage, independent of the saponifying stage, so that the graining operation does not interfere with the saponification. This makes it possible to use the optimum quantity and concentration of salt. The presence of salt in the saponifying stage may cause incomplete saponification. When the fitting is effected in two stages, the niger phase discharged at 52 from the second stage may advantageously be returned to the first fitting stage. The method also has the advantage that not more than two or three centrifugal separators are required, which is less than with other comparable processes. The pumps 2, 15, 27 and 41 also serve as mixing devices.

The installation illustrated in Fig. 2 differs from that of Fig. 1 only in certain respects, and the same reference numerals have therefore been used for corresponding parts in both illustrations. The differences between the two installations are set forth below.

The installation of Fig. 2 is intended for operation at elevated or super-atmospheric pressure and, if required, elevated temperature in the saponification and graining-out stages, whereas the fitting stages are effected at atmospheric pressure. The numerals 60, 61 and 62 denote dosing pumps (for example, of the piston type) for feeding fat, lye and salt solution into the pressure stages. Consequently, these pumps must work with elevated pressure, and they can advantageously be used for forcing the soap through the steps of the first two stages. The feed pump 20 illustrated in Fig. 1 can thus be dispensed with, which means a simplification of the installation. Fig. 2 shows a heater 63 in pipe 17 and also shows a pump 64 (for example, a piston pump) which is necessary to force the niger from pipe 38 into the pressure stages through the pipes 65 or 66, after adjustment of its concentration and, if required, purification. The dosing devices used for pipes 40 and 54 are not shown, as they may be of any conventional type.

The installation of Fig. 3 works entirely at elevated pressure. Although two fitting stages are shown, one is sometimes sufficient. This installation differs only very little from that of Fig. 2, and the reference numerals used in Fig. 2 apply in Fig. 3 for corresponding parts. The difference between Fig. 2 and Fig. 3 lies in the execution of the fitting stages. Between the graining stage and the first fitting stage, in Fig. 3, there is a tank 67 in which the pipes 25 and 40 and, if required, the pipe 56 end. The lye and the brine are preferably introduced by means of a dosing device 68 acting as a piston pump. A pipe 70 provided with a pump 69, preferably of the piston type, runs from the tank 67 to the circuit of the first fitting stage. This arrangement makes the pump 34 of Fig. 2 superfluous. Between the first and the second fitting stage there is also a tank 71 in which the pipe 39 from the separator of the first fitting stage and the pipe 54 for supply of lye, brine and water end. The latter pipe is provided with a pump 72, preferably of the piston type, as a dosing device. A pipe 74, preferably also provided with a pump 73 of the piston type, extends from the tank 71 to the circuit of the second fitting stage. The feed pump 48 of Fig. 2 may then be eliminated.

The embodiments illustrated and described as examples are shown only diagrammatically and for this reason various control valves desirable in such apparatus have not been shown in the drawings.

It will be apparent that the circulation pump 2, holding tank 3, mixer 4 and holding tank 1, are connected by piping 6—11 in series in a closed circuit in the order mentioned, reckoned in the direction of flow through the circuit. Through this first circuit, the pump 2 circulates a quantity of the product of reaction of a first reactant introduced from feed line 13 at a point through which the circulating reaction product passes on its way from holding tank 1 to holding tank 3, and a second reactant introduced from feed line 12 at a point through which the product passes on its way from holding tank 3 to mixer 4. The discharge from this first circuit is through line 14 from a point through which part of the circulating reaction product passes on its way from holding tank 1 to the first feed line 13. Thus, the first circuit serves to effect chemical reaction between the two reactants by continuously circulating a quantity of the reaction product through the closed circuit while adding the reactants at the respective specified points of the circuit and at a rate corresponding to the rate of discharge of the reaction product through line 14.

I claim:

1. Apparatus for effecting chemical reaction between two reactants, which comprises parts including a circulation pump, a first holding tank, a mixer, and a second holding tank, piping connecting all of said parts in series in a closed first circuit in the order mentioned, reckoned in the direction of flow of material through the circuit, a first reactant feed line leading into the circuit at a point through which said material flows on its way from the second tank to the first tank, a second reactant feed line leading into the circuit at a point through which said material flows on its way from the first tank to the mixer, and a discharge line leading from the circuit at a point through which said material passes on its way from the second holding tank to said first reactant feed line.

2. Apparatus for effecting chemical reaction between two reactants, which comprises parts including a circulation pump, a first holding tank, a mixer, and a second holding tank, piping connecting all of said parts in series in a closed first circuit in the order mentioned, reckoned in the direction of flow of material through the circuit, a first reactant feed line leading into the circuit at a point through which said material flows on its way from the second tank to the first tank, a second reactant feed line leading into the circuit at a point through which said material flows on its way from the first tank to the mixer, a discharge line leading from the circuit at a point through which said material passes on its way from the second tank to said first reactant feed line, a second circuit including a third holding tank and a second circulating pump communicating with the upper and lower portions of said third tank, a feed pipe leading from said discharge line of the first circuit into the second circuit between said second pump and said lower portion of the third tank, a feed line leading into the second circuit between said second pump and the lower portion of said third tank, a centrifugal separator, and a discharge pipe from the second circuit leading to the separator.

3. Apparatus according to claim 2, comprising also a feed pump in said last discharge pipe.

4. Apparatus according to claim 2, comprising also a heater in said second circuit.

5. Apparatus according to claim 1, comprising also a graining circuit including a third holding tank and a second circulating pump communicating with the upper and lower portions of said third tank, a feed pipe leading from said discharge line of the first circuit into the graining circuit between said second pump and said lower portion of the third tank, a salt solution feed line leading into the graining circuit between said second pump and said lower tank portion, a centrifugal separator, a discharge pipe from the graining circuit leading to the separator, said circuits, separator and interconnecting pipes forming a closed system adapted for operation at superatmospheric pressure, and dosing devices connected to said feed lines for supplying the respective feeds therethrough and forcing soap through said system.

6. Apparatus according to claim 1, comprising also a graining circuit including a third holding tank and a second circulating pump communicating with the upper and lower portions of said third tank, a feed pipe leading from said discharge line of the first circuit into the graining circuit between said second pump and said lower portion of the third tank, a salt solution feed line leading into the graining circuit between said second pump and said lower tank portion, a centrifugal separator, a discharge pipe from the graining circuit leading to the separator, a soap discharge pipe and an impurity discharge pipe leading from the separator, a fitting circuit to which said last soap discharge pipe leads and including a circulation pump, a heater and a holding tank connected in the order mentioned, reckoned in the direction of flow through said fitting circuit, a lye and salt solution supply pipe connected to the fitting circuit, said supply pipe and soap discharge pipe being connected to the fitting circuit between the holding tank and the pump therein, a second centrifugal separator, and an interconnecting pipe leading to said last separator from the fitting circuit in front of the pump therein.

7. Apparatus according to claim 1, comprising also a graining circuit including a third holding tank and a second circulating pump communicating with the upper and lower portions of said third tank, a feed pipe leading from said discharge line of the first circuit into the graining circuit between said second pump and said lower portion of the third tank, a salt solution feed line leading into the graining circuit between said second pump and said lower tank portion, a centrifugal separator, a discharge pipe from the graining circuit leading to the separator, a soap discharge pipe and an impurity discharge pipe leading from the separator, a fitting circuit to which said last soap discharge pipe leads and including a circulation pump, a heater and a holding tank connected in the order mentioned, reckoned in the direction of flow through said fitting circuit, a lye and salt solution supply pipe connected to the fitting circuit, said supply pipe and soap discharge pipe being connected to the fitting circuit between the holding tank and the pump therein, a second centrifugal separator, an interconnecting pipe leading to said last separator from the fitting circuit in front of the pump therein, a pipe leading from said last separator for discharge of fitted soap, a second fitting circuit including a circulation pump, a heater and a holding tank connected in the order mentioned, reckoned in the direction of flow therethrough, a supply pipe for feeding lye, salt solution and water into the second fitting circuit, said last supply pipe and fitted soap discharge pipe being connected to the second fitting circuit between the holding tank and the pump therein, a third centrifugal separator, and an interconnecting pipe leading to the third separator from the second fitting circuit between the tank and pump thereof but in front of said fitted soap discharge pipe.

8. Apparatus according to claim 1, comprising also a graining circuit including a third holding tank and a second circulating pump communicating with the upper and lower portions of said third tank, a feed pipe leading from said discharge line of the first circuit into the graining circuit between said second pump and said lower portion of the third tank, a salt solution feed line leading into the graining circuit between said second pump and said lower tank portion, a centrifugal separator, a discharge pipe from the graining circuit leading to the separator, a soap discharge pipe and an impurity discharge pipe leading from the separator, a fitting circuit to which said last soap discharge pipe leads and including a circulation pump, a heater and a holding tank connected in the order mentioned, reckoned in the direction of flow through said fitting circuit, a lye and salt solution supply pipe connected to the fitting circuit, said supply pipe and soap discharge pipe being connected to the fitting circuit between the holding tank and the pump therein, a second centrifugal separator, a pipe leading to said last separator from the fitting circuit in front of the pump therein, niger and soap discharge pipes leading from said last separator, and a pipe connecting said niger discharge pipe to one of said circuits in advance of the fitting circuit.

9. Apparatus according to claim 1, comprising also a graining circuit including a third holding tank and a second circulating pump communicating with the upper and lower portions of said third tank, a feed pipe leading from said discharge line of the first circuit into the graining circuit between said second pump and said lower portion of the third tank, a salt solution feed line leading into the graining circuit between said second pump and said lower tank portion, a centrifugal separator, a discharge pipe from the graining circuit leading to the separator, a soap discharge pipe and an impurity discharge pipe leading from the separator, a fitting circuit to which said last soap discharge pipe leads and including a circulation pump, a heater and a holding tank connected in the order mentioned, reckoned in the direction of flow through said fitting circuit, a lye and salt solution supply pipe connected to the fitting circuit, said supply pipe and soap discharge pipe being connected to the fitting circuit between the holding tank and the pump therein, a second centrifugal separator, an interconnecting pipe leading to said last separator from the fitting circuit in front of the pump therein, a pipe leading from said last separator for discharge of fitted soap, a second fitting circuit including a circulation pump, a heater and a holding tank connected in the order mentioned, reckoned in the direction of flow therethrough, a supply pipe for feeding lye, salt solution and water into the second fitting circuit, said last supply pipe and fitted soap discharge pipe being connected to the second fitting circuit between the holding tank and the pump therein, a third centrifugal separator, and an interconnecting pipe leading to the third separator from the second fitting circuit between the tank and pump thereof but in front of said fitted soap discharge pipe, the third separator having separate discharge pipes for niger and soap, and a pipe connecting said last niger discharge pipe to the first fitting circuit.

10. Apparatus according to claim 6, comprising also a feed pump in said pipe leading to the last separator from the fitting circuit.

11. Apparatus according to claim 7, comprising also a feed pump in said pipe leading to the third separator from the second fitting circuit.

12. Apparatus according to claim 1, comprising also a graining circuit including a third holding tank and a second circulating pump communicating with the upper and lower portions of said third tank, a feed pipe leading from said discharge line of the first circuit into the graining circuit between said second pump and said lower portion of the third tank, a salt solution feed line leading into the graining circuit between said second pump and said lower tank portion, a centrifugal separator, a discharge pipe from the graining circuit leading to the separator, a soap discharge pipe and an impurity discharge pipe leading from the separator, a fitting circuit to which said last soap discharge pipe leads and including a circulation pump, a heater and a holding tank connected in the order mentioned, reckoned in the direction of flow through said fitting circuit, a lye and salt solution supply pipe connected to the fitting circuit, said supply pipe and soap discharge pipe being connected to the fitting circuit between the holding tank and the pump therein, a second centrifugal separator, a pipe leading to said last separator from the fitting circuit, the fitting circuit, second separator and interconnecting pipe forming a closed system adapted for operation at super-atmospheric pressure, a feed pump and a tank in said soap discharge pipe leading from the first separator to the fitting circuit, said lye and salt solution pipe also communicating with said last tank, and a dosing device in said last pipe.

13. Apparatus according to claim 1, comprising also a graining circuit including a third holding tank and a second circulating pump communicating with the upper and lower portions of said third tank, a feed pipe leading from said discharge line of the first circuit into the graining circuit between said second pump and said lower portion of the third tank, a salt solution feed line leading into the graining circuit between said second pump and said lower tank portion, a centrifugal separator, a discharge pipe from the graining circuit leading to the separator, a soap discharge pipe and an impurity discharge pipe leading from the separator, a fitting circuit to which said last soap discharge pipe leads and including a circulation pump, a heater and a holding tank connected in the order mentioned, reckoned in the direction of flow through said fitting circuit, a lye and salt solution supply pipe connected to the fitting circuit, said supply pipe and soap discharge pipe being connected to the fitting circuit between the holding tank and the pump therein, a second centrifugal separator, and interconnecting pipe leading to said last separator from the fitting circuit in front of the pump therein, a pipe leading from said last separator for discharge of fitted soap, a heater and a holding tank connected in the order mentioned, reckoned in the direction of flow therethrough, a supply pipe for feeding lye, salt solution and water into the second fitting circuit, said last supply pipe and fitted soap discharge pipe being connected to the second fitting circuit between the holding tank and the pump therein, a third centrifugal separator, and an interconnecting pipe leading to the third separator from the second fitting circuit between the tank and pump thereof but in front of said fitted soap discharge pipe, said fitting circuits, second and third separators and interconnecting pipes forming a closed system adapted for operation at super-atmospheric pressure, a feed pump and a tank in each of said soap discharge pipes leading to the fitting circuits, said supply pipes to the first and second fitting circuits leading thereto, respectively, by way of the tanks in the soap discharge pipes leading to the first and second fitting circuits, and a dosing device in each of said supply pipes.

14. Apparatus according to claim 13, comprising also a niger discharge pipe and a soap discharge pipe leading from said third separator, and a pipe connecting said last niger discharge pipe to the tank in said soap discharge pipe leading to the first fitting circuit.

15. Apparatus according to claim 1, comprising also a heater located in said circuit between the mixer and the second holding tank.

References Cited in the file of this patent

UNITED STATES PATENTS

| | | |
|---|---|---|
| 1,594,024 | Soule | July 27, 1926 |
| 2,300,751 | Scott et al. | Nov. 3, 1942 |
| 2,332,527 | Pyzel | Oct. 26, 1943 |
| 2,572,102 | Bodman et al. | Oct. 23, 1951 |